April 23, 1946.  J. E. SCHUMANN  2,399,146
TIRE TOOL
Filed Oct. 4, 1943
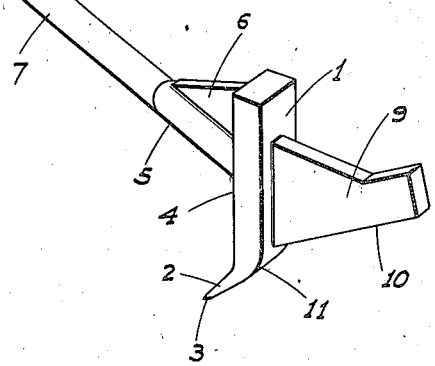
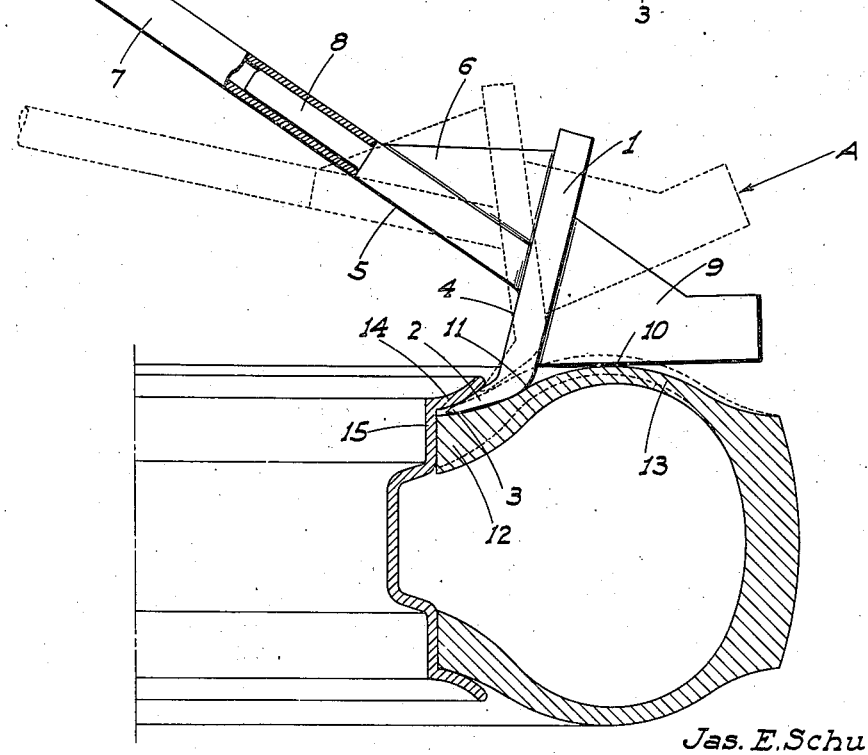
Inventor
Jas. E. Schumann
By Webster & Webster
Attorneys

UNITED STATES PATENT OFFICE 2,399,146

TIRE TOOL

James E. Schumann, Fresno, Calif.

Application October 4, 1943, Serial No. 504,839

1 Claim. (Cl. 157—6)

This invention relates to tire tools, or tire irons as they are commonly called, and which are used to facilitate the removal of a tire from the conventional form of drop-center rim, and particularly to break one bead of the tire loose from the rim, and then shift the corresponding side of the tire laterally of the rim and into the drop-center portion of the rim.

There is never any great difficulty in effecting this operation with the relatively small and light passenger-car size of tire. With the large and heavy truck and tractor tires and the like however, the conventional tire iron is entirely inadequate, and frequently even the full weight of the operator, pressed down against the side of the tire, is insufficient to break the tire loose from the rim.

It is therefore the principal object of my invention to provide a tire tool or iron, particularly intended for use on large heavy tires, so constructed and arranged that once the tool is engaged between the tire and rim, a tremendous leverage and pressure may be easily exerted against the tire in a direction to break the same free of the rim and force the tire laterally inward.

A further object is to construct the tool so that the necessary heavy blows may be given the same at the most effective point, when initially entering the tool between the rim and tire to break the latter loose, and without the likelihood of the tool being distorted or damaged by such blows.

A further object of the invention is to produce a simple, inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views:

Figure 1 is a perspective view of the tire tool.

Figure 2 is a side elevation of the tool as in operation, the initial entering position of the tool relative to the tire and rim being shown in dotted lines.

Referring now to the characters of reference on the drawing, the tool comprises a heavy, short and mainly straight bar 1 of rectangular oblong form in cross section and formed at one end with a wedge shaped portion 2 which is relatively sharp edged along its outer end as at 3.

This portion is bent away from one side face 4 of the bar at an obtuse angle thereto, the edge 3 being in a plane parallel to that of the side face 4.

Projecting from the face 4 intermediate the ends of the straight portion thereof is a long handle 5, the portion of which adjacent the bar is braced therefrom by a web or gusset 6 on the side of the handle opposite the wedge 2. The handle is disposed at an obtuse angle to the bar in opposed relation to the wedge. This handle from end to end may be permanent with the bar, or it may be made as a two-piece unit as shown; the outer relatively long main handle member 7 being tubular and removably engaging a tang 8 projecting from the outer end of the shorter bar-mounted base portion of the handle as shown in Figure 2.

Projecting from the side face of the bar 1 opposite face 4 is a rigid plate 9, elongated in a direction lengthwise of bar 1, and having a straight edge 10 along the side nearest the wedge end of the bar, and a flat face on its outer end. This edge is disposed at an obtuse angle to the face of the bar and is located adjacent the inception of the wedge, the latter at said inception rounding smoothly into the corresponding side of the bar with a curve of relatively large radius as shown at 11.

In operation, the tire is laid on the floor as usual and tool is held so that the point of the wedge is disposed between the upper head 12 of the tire 13 and the adjacent flange 14 of the rim 15, with the under side of the wedge close to or actually resting against the tire. The wedge is then driven between the tire bead and rim flange by means of blows directed against the outer end of plate 9 by a sledge hammer or the like as indicated by the arrow A in Figure 2. When the wedge is fully inserted, an upward pulling pressure is placed on handle 5, in the direction of arrow B. The tool then becomes a lever whose fulcrum is a point on the upper face of the wedge where it engages the rim flange. The under side of the wedge radially out from this fulcrum then presses the tire bead laterally in from its initial rim engaging position, the rounded surface 11 preventing any possible breaking of the tire fabric at the bend of the tool. At the same time, the edge 10 of plate 9 engages the side of the tire radially out from the bead and also forces the tire laterally inward, taking some of the pressure off said surface 11. When the tire has been thus loosened at one point, the tool is shifted about the tire by hammer blows directed against one edge of the bar 1, a levering of the tool as above described being performed with each such shift of the tool.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A tire tool comprising a bar of rectangular oblong form in cross section, a wedge shaped portion formed at one end of the bar and bending away from one face of the bar at an obtuse angle thereto, the outer edge of the wedge portion lying in a plane parallel to such face, a lever handle projecting from said face at an obtuse angle to the bar and in a direction diverging outwardly away from the angle of the wedge portion, a rigid plate projecting from the face of the bar opposite such first named face such plate being elongated in a direction lengthwise of the bar, such plate having a straight edge along the side nearest the wedge end of the bar and a flat face at its outer end, such straight edge of the plate being disposed at an obtuse angle to the adjacent face of the bar and being located at a point adjacent the juncture of the wedge and bar, the wedge portion at such point rounding smoothly into the adjacent face of the bar with a curve of relatively wide radius, whereby the straight edge of the plate and said curve of the wedge portion co-operate to apply pressure substantially equally against the bead and side wall portions of a tire when the tool is in use.

JAMES E. SCHUMANN.